US012731987B2

(12) United States Patent
Liu

(10) Patent No.: US 12,731,987 B2
(45) Date of Patent: Sep. 8, 2026

(54) POWER SUPPLY SYSTEMS AND CONTROL METHODS FOR GENERATING OPERATION POWER SOURCE

(71) Applicant: Weltrend Semiconductor Inc., Hsinchu (TW)

(72) Inventor: Jeng-Cheng Liu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 115 days.

(21) Appl. No.: 18/976,644

(22) Filed: Dec. 11, 2024

(65) Prior Publication Data

US 2025/0323499 A1 Oct. 16, 2025

(30) Foreign Application Priority Data

Apr. 15, 2024 (TW) ................................ 113114017

(51) Int. Cl.
*H02J 1/08* (2026.01)
*G05F 1/56* (2006.01)
*H02J 1/10* (2006.01)

(52) U.S. Cl.
CPC ................ *H02J 1/084* (2020.01); *G05F 1/56* (2013.01); *H02J 1/10* (2013.01)

(58) Field of Classification Search
CPC ................ H02J 1/084; H02J 1/10; G05F 1/56
See application file for complete search history.

(56) References Cited

U.S. PATENT DOCUMENTS

| | | | | |
|---|---|---|---|---|
| 2004/0004402 A1* | 1/2004 | Kippley | H02J 9/062 307/82 |
| 2015/0214781 A1* | 7/2015 | Ye | H02J 9/061 307/64 |
| 2022/0263339 A1* | 8/2022 | Wang | H02J 4/00 |

* cited by examiner

*Primary Examiner* — Lakaisha Jackson
(74) *Attorney, Agent, or Firm* — McClure, Qualey & Rodack, LLP

(57) ABSTRACT

An embodiment of the invention discloses a power supply system with first and second rectifier filters, and a power management module. The first rectifier filter is connected to a first winding for providing an output power source. The second rectifier filter is connected to an auxiliary winding for providing an auxiliary power source. The first winding and the auxiliary winding are inductively coupled with each other, and the first winding has a first number of turns larger than auxiliary winding does. The power management module selects one of the output power source and the auxiliary power source to be an input power source in response to one of the output power source and an operation power source. The power management module uses the input power source to generate and regulate the operation power source.

11 Claims, 5 Drawing Sheets

300
306
308
VCC
VBUS
$V_{BUS}$
302
304A
$V_{CC}$
VCC
CC1
305A
CC2
USB Type-C Connector
GND
$V_{AUX1}$
VAUX1
VDD
305B
$V_{DD}$
LOGIC
312
310
304B
$V_{AUX2}$
VAUX2
305C
USB PD CTRL
301
304C
GND

POWER SUPPLY SYSTEMS AND CONTROL METHODS FOR GENERATING OPERATION POWER SOURCE

CROSS-REFERENCE TO RELATED APPLICATION

This application claims priority to and the benefit of Taiwan Application Series Number 113114017 filed on Apr. 15, 2024, which is incorporated by reference in its entirety.

BACKGROUND

The present disclosure relates generally to power supply systems generating an operation power source, and more particularly, to control methods and power supply systems efficiently selecting one of an output power source and an auxiliary power source to generate the operation power source.

PD (Power Delivery) released by the USB Implementers Forum (USB-IF) provides a fast-charging technology. PD uses the USB-C port for charging and can be applied to a wide range of devices. In addition to being a charging standard supported by iPhone/iPad, it is also commonly used for laptops, medical equipment, power tools, etc.

The extended power range (EPR) of PD version 3.1 allows a USB Type-C port to provide up to 240 watts of power, defining a maximum output voltage of 48V and a minimum output voltage of 5V. FIG. 1 shows power supply system 100 that complies with PD version 3.1. In other words, output power source $V_{CC}$ in power supply system 100 can be as high as 48V and as low as 5V.

Through energy storage and release by transformer 102, rectifier filter 104 rectifies the current generated by a secondary winding of the transformer 102, establishing output power source $V_{CC}$ between output power line VCC and ground line GND. USB PD controller 101 communicates with another USB PD controller at the other end of the USB Type-C cable (not shown) through channel configuration (CC1 and CC2) lines in USB Type-C connector 108 to determine the specifications of the output power source $V_{CC}$. Once output power source $V_{CC}$ is ready, USB PD controller 101 turns ON power switch 106, allowing output power source $V_{CC}$ to become bus power source $V_{BUS}$ on bus power line VBUS, supplying power to the electronic device at the other end. As shown in FIG. 1, USB PD controller 101 has linear dropout (LDO) 110. Linear dropout 110 uses output power source $V_{CC}$ as an input power source and generates operation power source $V_{DD}$ with a substantially voltage (5V, for example) on power line VDD, which is used to supply power to internal logic circuit 112 of USB PD controller 101.

In FIG. 1, when USB PD controller 101 operates with output power source $V_{CC}$ of 48V, it will consume significantly more power compared to when the output power source $V_{CC}$ is 5V. For instance, the current consumed by internal logic circuit 112 is relatively constant, assumed to be around 5 mA. In this case, when output power source $V_{CC}$ is 48V, the power consumption of USB PD controller 101 would be approximately 48V*5 mA=240 mW. However, when output power source $V_{CC}$ is 5V, the power consumption would be as much less as around 5V*5 mA=25 mW.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
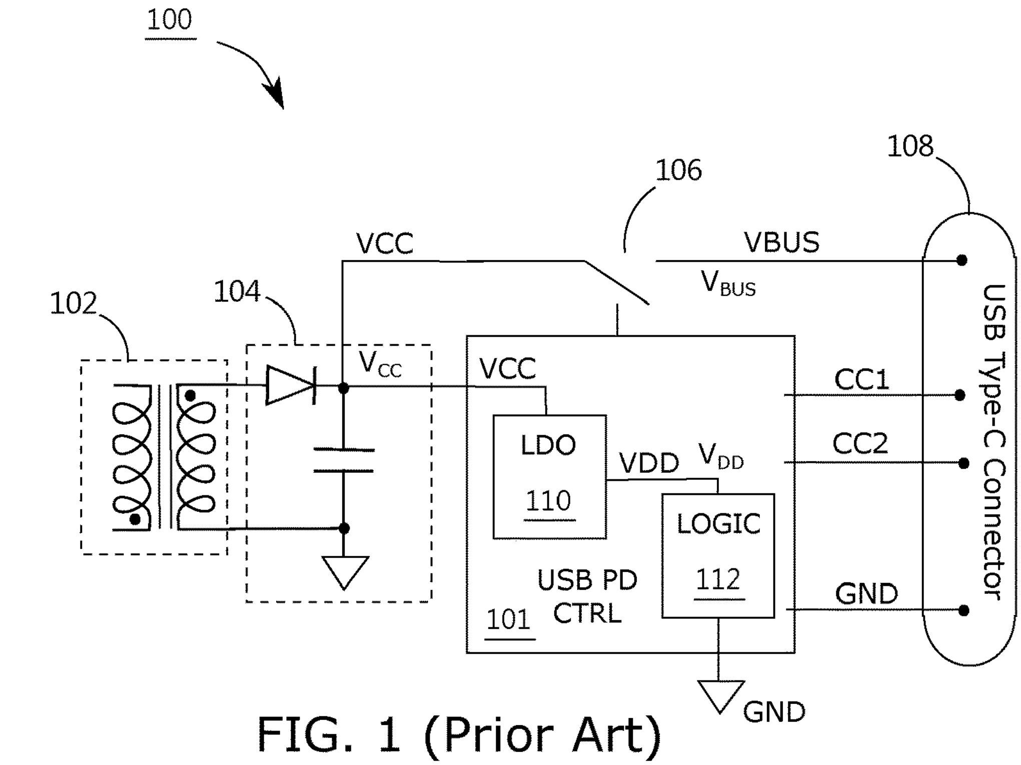
FIG. 1 shows a power supply system of a prior art.
Figure 2:
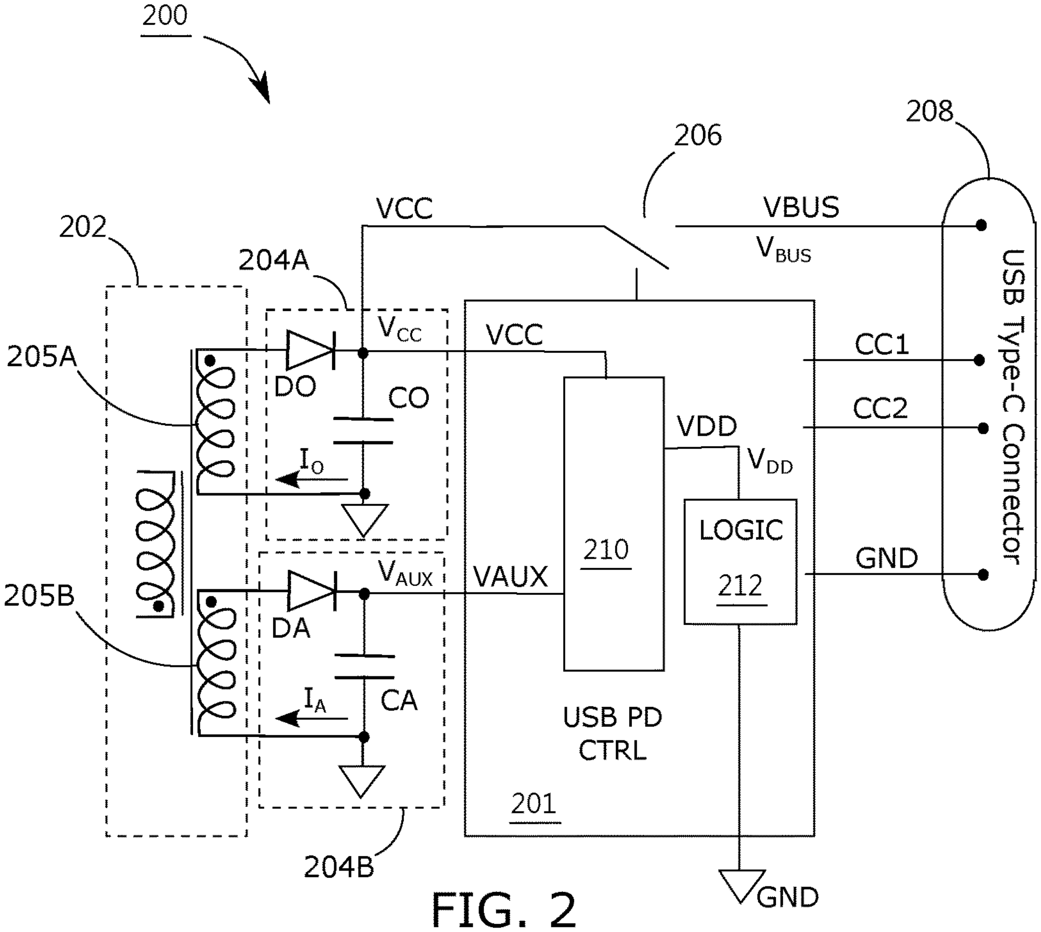
FIG. 2 illustrates a power supply system according to an embodiment of the invention.

FIG. 2 illustrates power supply system 200 according to an embodiment of the invention, which can provide output power source $V_{CC}$ compliant with PD version 3.1, capable of maintaining the voltage of output power source $V_{CC}$ at a maximum of 48V and a minimum of 5V. The similar or the same features between power supply system 200 in FIG. 2 and power supply system 100 in FIG. 1 can be understood from the previous descriptions and might not be repeated here. Although USB PD is used as an example in this invention, the invention is not limited to this; embodiments of the present invention may also apply to other power specifications or architectures. All equivalent changes and modifications made according to the scope of the patent claims of this invention should be considered within the scope of the present invention.

In FIG. 2, power supply system 200 includes rectifier filters 204A and 204B. Rectifier filter 204A rectifies output current $I_O$ from winding 205A to provide output power source $V_{CC}$ at output terminal $V_{CC}$. Similarly, rectifier filter 204B rectifies output current $I_A$ from winding 205B to provide auxiliary power source $V_{AUX}$ at auxiliary terminal VAUX. Rectifier filter 204A consists of rectifier diode DO and output capacitor CO, and rectifier filter 204B consists of rectifier diode DA and output capacitor CA. Both windings 205A and 205B are parts of transformer 202, magnetically coupled to each other. The number of turns $N_{205A}$ of winding 205A is greater than the number of turns $N_{205B}$ of winding 205B. In this example, $N_{205A}/N_{205B}$ equals 3.

Connected to USB Type-C connector 208, USB PD controller 201 controls power switch 206 and includes power management module 210, which is connected to output power source $V_{CC}$ and auxiliary power source $V_{AUX}$. In response to output power source $V_{CC}$, auxiliary power source $V_{AUX}$, or operation power source $V_{DD}$, power management module 210 selects one of output power source $V_{CC}$ and auxiliary power source $V_{AUX}$ to be an input power source, which provides energy to establish operation power source $V_{DD}$ at power line VDD.

For example, assumingly the current consumed by logic circuit 212 is approximately constant at 5 mA. When output power source $V_{CC}$ is 48V, auxiliary power source $V_{AUX}$ is 16V, sufficiently high to generate and regulate operation power source $V_{DD}$ at approximately 5V. Therefore, power management module 210 does not select output power source $V_{CC}$ as the input power source. Instead, auxiliary power source $V_{AUX}$ is selected to serve as the input power source at this time, and the power consumption of USB PD controller 201 would be approximately 16*5 mW. When output power source $V_{CC}$ is 5V, auxiliary power source $V_{AUX}$ becomes 1.67V, too low to generate 5V operation power source $V_{DD}$. Thus, power management module 210 selects output power source $V_{CC}$ to be the input power source for generating and regulating operation power source $V_{DD}$, resulting in a power consumption of about 5*5 mW for USB PD controller 201. Compared to FIG. 1 in the prior art, when output power source $V_{CC}$ is 48V, the power consumption of USB PD controller 201, which is only 16*5 mW, is significantly lower than the power consumption of USB PD controller 101, which is as high as 48*5 mW. Power supply system 200 provides an energy-saving result.

Rectifier diodes DO and DA in FIG. 2 could be replaced by synchronous rectifiers in some embodiments of the invention. Winding 205B could be a part of winding 205A. For example, an intermediate tap on winding 205A serves as one end of winding 205B to connect to rectifier diode DA.

Embodiment One

Figure 3A:
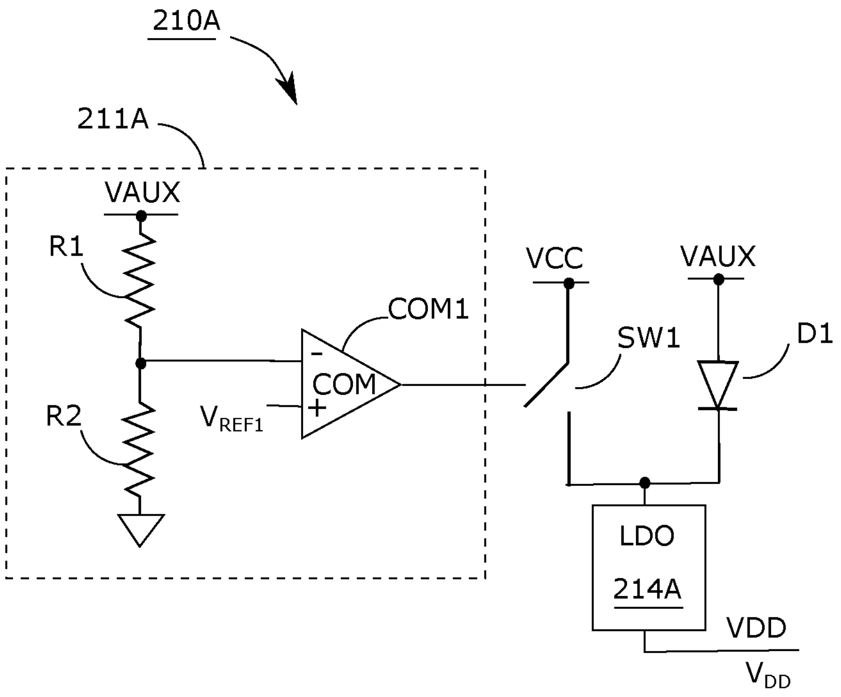
FIG. 3A shows an example of the power management module in FIG. 2.

FIG. 3A shows power management module 210A, an example of power management module 210 in FIG. 2. Power management module 210A includes detection circuit 211A, selection switch SW1, diode D1, and linear dropout 214A.

Detection circuit 211A controls selection switch SW1 and detects whether auxiliary power source $V_{AUX}$ has a sufficiently high voltage, so as to select or reject output power source $V_{CC}$ as an input power source. Resistors R1 and R2 connected in series form a voltage divider, which divides the voltage of auxiliary power source $V_{AUX}$ and supplies the result that comparator COM1 compares with reference voltage $V_{REF1}$. The configuration of detection circuit 211A equally sets a first reference voltage equal to $V_{REF1}*(R_1+R_2)/R_2$, where $R_1$ and $R_2$ are the resistances of resistors R1 and R2, respectively. For example, the first reference voltage is 5.3V. If comparator COM1 determines that auxiliary power source $V_{AUX}$ exceeds 5.3V, it turns OFF selection switch SW1, rejecting output power source $V_{CC}$ as an input power source. Meanwhile, as diode D1 is forward biased, auxiliary power source $V_{AUX}$ is effectively chosen as the input power source to supply power to linear dropout 214A, generating operation power source $V_{DD}$ of approximately 5V. Conversely, if comparator COM1 determines that auxiliary power source $V_{AUX}$ is less than 5.3V, it turns ON selection switch SW1. Meanwhile, diode D1 is reversely biased, so output power source $V_{CC}$ is selected as the input power source to supply power to linear dropout 214A, which generates operation power source $V_{DD}$ of approximately 5V.

In some embodiments, detection circuit 211A could be configured with hysteresis to prevent comparator COM1 from rapidly toggling between its output logic states when the auxiliary power source $V_{AUX}$ is approximately equal to 5.3V. For example, detection circuit 211A will only change to turn OFF selection switch SW1 when auxiliary power source $V_{AUX}$ rises above 5.4V and to turn ON selection switch SW1 when auxiliary power source $V_{AUX}$ falls below 5.3V.

Embodiment Two

Figure 3B:
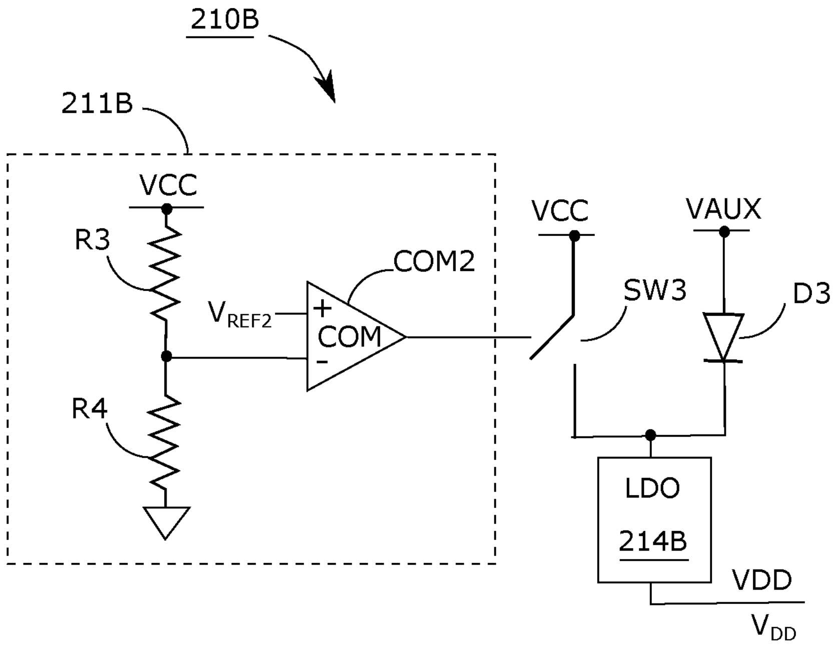
FIG. 3B shows another example of the power management module in FIG. 2.

FIG. 3B shows power management module 210B, an example of the power management module 210 in FIG. 2. Power management module 210B includes detection circuit 211B, selection switch SW3, diode D3, and linear dropout 214B. The similarities or equivalent parts between power management module 210B and power management module 210A can be referenced from the previous descriptions and will not be repeated here.

Detection circuit 211B monitors whether the voltage of output power source $V_{CC}$ is too high, to decide whether or not to select output power source $V_{CC}$ as the input power source for linear dropout 214B. The configuration of detection circuit 211B effectively sets a second reference voltage equal to $V_{REF2}\times(R_3+R_4)/R_4$, where $R_3$ and $R_4$ are the resistances of resistors R3 and R4, respectively. In one example, the second reference voltage is 15.9V. When output power source $V_{CC}$ exceeds 15.9V, auxiliary power source $V_{AUX}$ is also above 5.3V theoretically. In this case, selection switch SW3 is turned OFF, and output power source $V_{CC}$ is not selected as the input power source. Meanwhile, auxiliary power source $V_{AUX}$ supplies power to linear dropout 214B through diode D3, seemingly being chosen as the input power source for linear dropout 214B. When output power source $V_{CC}$ falls below 15.9V, selection switch SW3 is turned ON, and output power source $V_{CC}$ is selected as the input power source supplying power to linear dropout 214B to generate operation power source $V_{DD}$ of approximately 5V.

Embodiment Three

Figure 4:
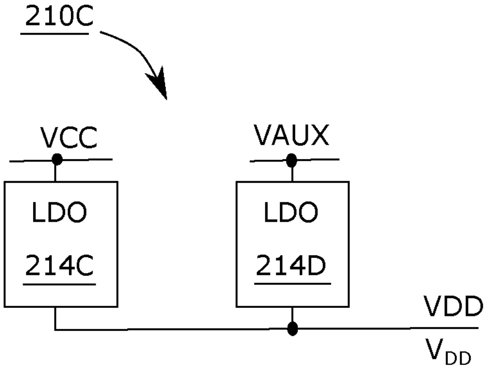
FIG. 4 demonstrates another power management module.

FIG. 4 demonstrates power management module 210C, an example of power management module 210 in FIG. 2. In response to operation power source $V_{DD}$, power management module 210C decides whether or not to select output power source $V_{CC}$ as the input power source for linear dropout 214B.

Power management module 210C includes linear dropouts 214C and 214D. Linear dropout 214C uses output power source $V_{CC}$ as its own input power source to generate operation power source $V_{DD}$, and is configured to regulate operation power source $V_{DD}$ at a relatively lower preset voltage, such as 4.7V for example. Linear dropout 214D uses auxiliary power source $V_{AUX}$ as its own input power source to generate operation power source $V_{DD}$, and is configured to regulate operation power source $V_{DD}$ at a relatively higher preset voltage, 5V in this example. Operation power source $V_{DD}$, Whether at 4.7V or 5V, allows logic circuit 212 to function normally.

This configuration in FIG. 4 automatically determines whether auxiliary power source $V_{AUX}$ is sufficiently high based on the voltage of operation power source $V_{DD}$, so as to turn ON or OFF linear dropout 214C. In other words, output power source $V_{CC}$ is automatically selected or rejected to be an input power source. If operation power source $V_{DD}$ is at 5V stably, linear dropout 214C is turned OFF because operation power source $V_{DD}$ exceeds 4.7V, and output power source $V_{CC}$ does not supply power to operation power source $V_{DD}$, whose power now is supplied from auxiliary power source $V_{AUX}$ by linear dropout 214D to regulate at 5V. In case that operation power source $V_{DD}$ is at 4.7V stably, it implies that auxiliary power source $V_{AUX}$ is too low to support operation power source $V_{DD}$ at 5V, so linear dropout 214C automatically takes over using output power source $V_{CC}$ to regulate operation power source $V_{DD}$ at 4.7V.

Figure 5:
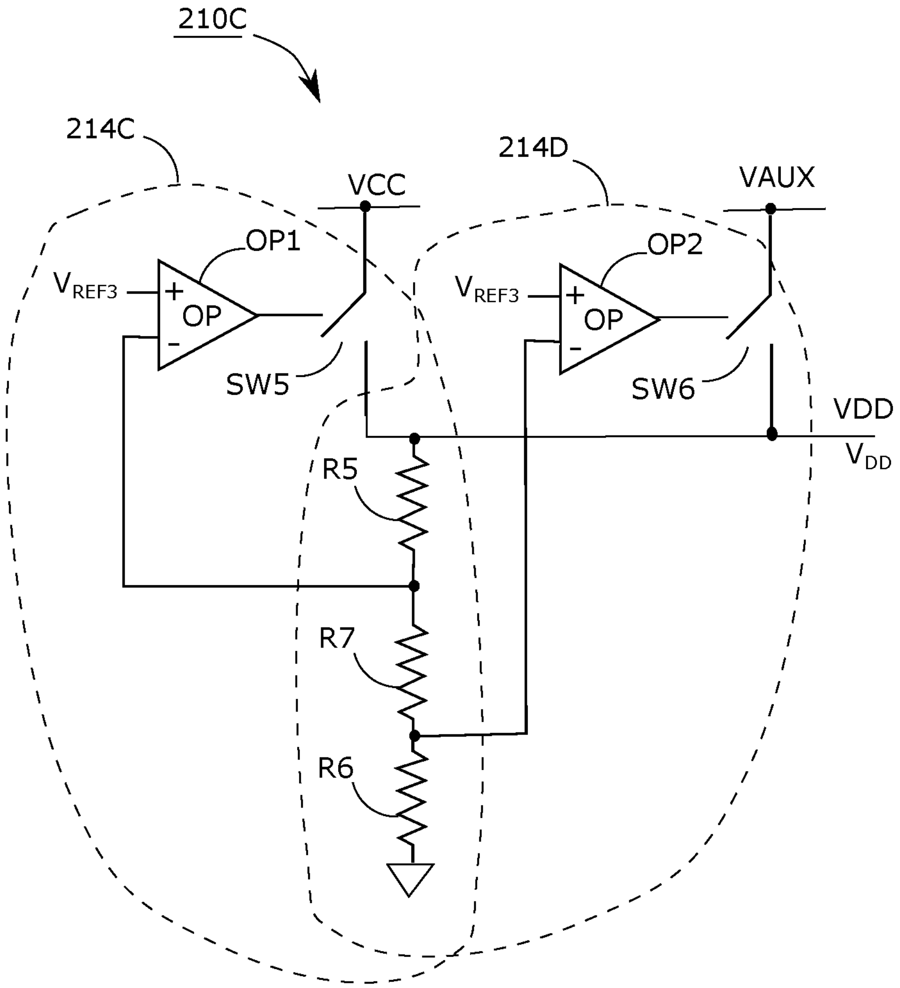
FIG. 5 illustrates an example of the power management module in FIG. 4.

FIG. 5 illustrates an example of power management module 210C from FIG. 4. Resistors R5, R6, and R7 are connected in series between power line VDD and ground line GND, providing two joints connected to operational amplifiers OP1 and OP2, respectively.

Linear dropout 214C substantially comprises power switch SW5, operational amplifier OP1, and resistors R5, R6, and R7. In one embodiment, $V_{REF3}*(R_5+R_6+R_7)/(R_6+R_7)$ equals 4.7V, where $R_5$, $R_6$, and $R_7$ are resistances of resistors R5, R6 and R7 respectively. Simply speaking, operational amplifier OP1 compares operation power source $V_{DD}$ with 4.7V to control power switch SW5.

Similarly, linear dropout 214D substantially comprises power switch SW6, operational amplifier OP2, and resistors R5, R6, and R7. In one embodiment, $V_{REF3}*(R_5+R_6+R_7)/(R_6)$ equals 5V, so operational amplifier OP2 compares operation power source $V_{DD}$ with 5V to control power switch SW6.

Some embodiments might replace resistors R5, R6 and R7 in FIG. 5 with two voltage dividers, each having two resistors connected in series between power line VDD and ground line GND. One voltage divider feeds a divided version of operation power source $V_{DD}$ to operational amplifier OP1, so linear dropout 214C could regulate operation power source $V_{DD}$ at 4.7V, while the other voltage divider feeds another divided version to operational amplifier OP2 to regulate operation power source $V_{DD}$ at 5V.

Embodiment Four

Figure 6:
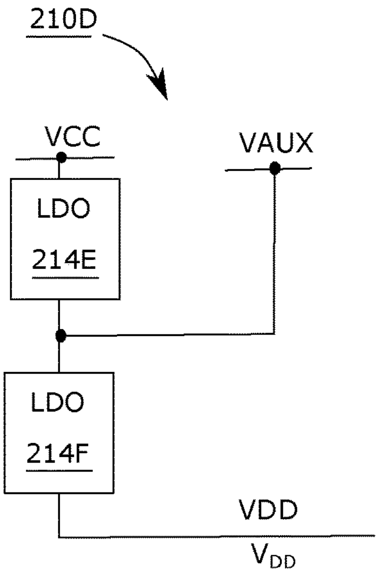
FIG. 6 shows an example of the power management module in FIG. 2.

FIG. 6 shows power management module 210D, an example of power management module 210 in FIG. 2. Power management module 210D could determine whether to draw power from output power source $V_{CC}$ based on whether auxiliary power source $V_{AUX}$ has sufficient voltage.

Power management module 210D includes linear dropouts 214E and 214F. Linear dropout 214E uses output power source $V_{CC}$ as its input power source and can be used to supply power to auxiliary power source $V_{AUX}$, regulating auxiliary power source $V_{AUX}$ at a predetermined voltage, exemplified here as 5.3V. In this embodiment, auxiliary power source $V_{AUX}$ may be established either by being powered from output power source $V_{CC}$ or by being supplied through winding 205B of FIG. 2 via rectifier filter 204B. Linear dropout 214F uses auxiliary power source $V_{AUX}$ as its input power source to generate operation power source $V_{DD}$, regulating it at a preset voltage, exemplified here as 5V.

This configuration enables linear dropout 214E to automatically turn ON or OFF depending on whether auxiliary power source $V_{AUX}$ has a sufficiently high voltage. If winding 205B in FIG. 2 raises the voltage of auxiliary power source $V_{AUX}$ to be more than 5.3V, linear dropout 214E in FIG. 6 will be automatically OFF, and output power source $V_{CC}$ will not supply power for supporting auxiliary power source $V_{AUX}$. When winding 205B is unable to keep auxiliary power source $V_{AUX}$ above 5.3V, linear dropout 214E in FIG. 6 will automatically draw power from output power source $V_{CC}$ to raise auxiliary power source $V_{AUX}$ up to 5.3V.

Figure 7:
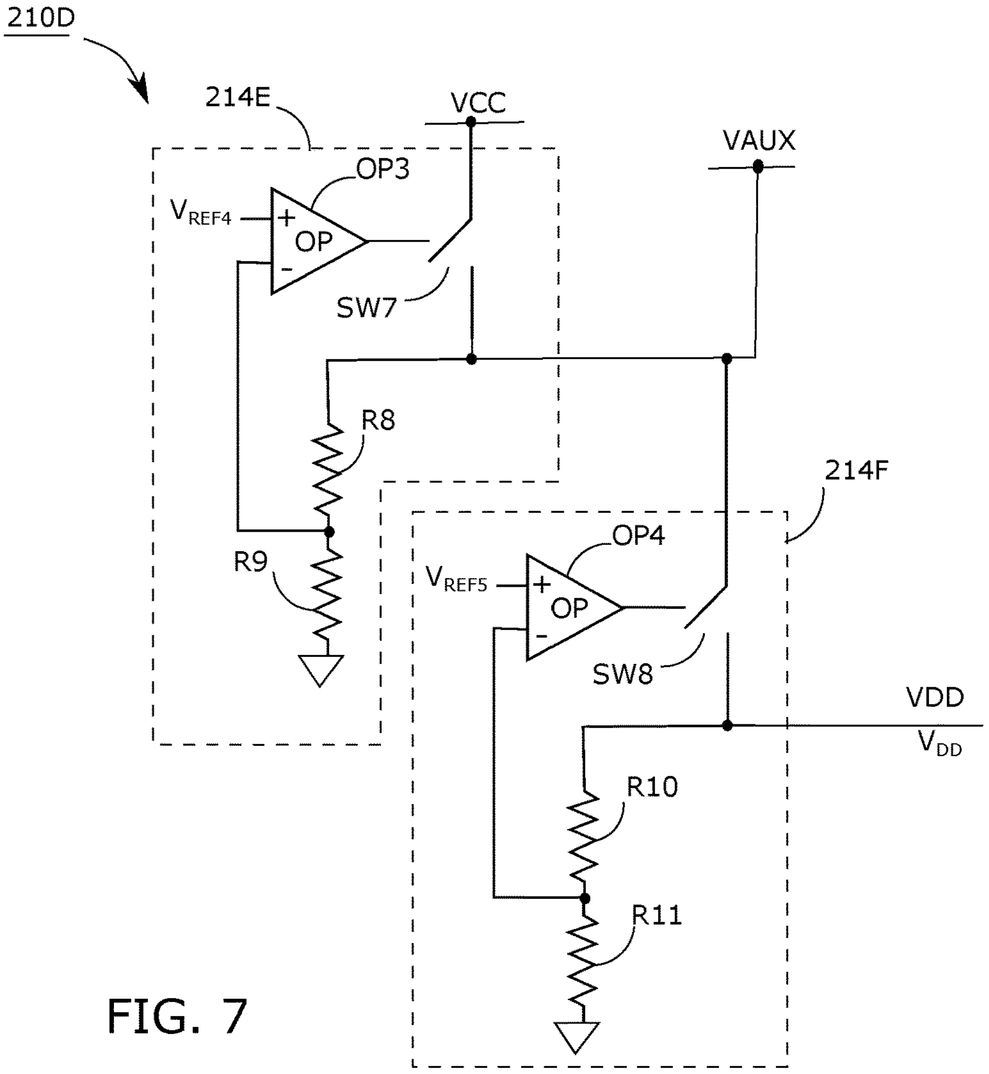
FIG. 7 details the power management module in FIG. 6.

FIG. 7 details power management module 210D in FIG. 6. Linear dropout 214E includes power switch SW7, operational amplifier OP3, and resistors R8 and R9. $V_{REF4}*(R_8+R_9)/R_9$ is set to 5.3V, where Re and Ry are the resistances of resistors R8 and R9, respectively. Simply put, operational amplifier OP3 compares auxiliary power source $V_{AUX}$ with 5.3V to control power switch SW7, thereby regulating auxiliary power source $V_{AUX}$ at 5.3V.

Similarly, linear dropout 214F in FIG. 7 includes power switch SW8, operational amplifier OP4, and resistors R10 and R11. Operational amplifier OP4 compares operation power source $V_{DD}$ with 5V to control power switch SW8, thereby regulating operation power source $V_{DD}$ at 5V.

Power management module 210D in FIG. 7 has an advantage: the effective capacitance on output power line $V_{CC}$ changes with the voltage of output power source $V_{CC}$. When output power source $V_{CC}$ is regulated at 5V by USB PD controller 201, power switch SW7 remains ON. As a result, output capacitor CA in FIG. 2 is connected in parallel with output capacitor co, providing voltage stabilization for output power source $V_{CC}$ and supporting better transient response for large current fluctuations. When output power source $V_{CC}$ is regulated at 20V by USB PD controller 201, power switch SW7 remains OFF, so output capacitor CA is no longer connected in parallel with output capacitor CO, which solely provides voltage stabilization for output power source $V_{CC}$. Generally, the lower the voltage of the output power source $V_{CC}$, the larger the current fluctuations in the transient response.

Power supply system 200 in FIG. 2 includes only one auxiliary power source $V_{AUX}$, but this invention is not limited to however. Embodiments of the invention may have several auxiliary power sources.

Embodiment Five

Figure 8:
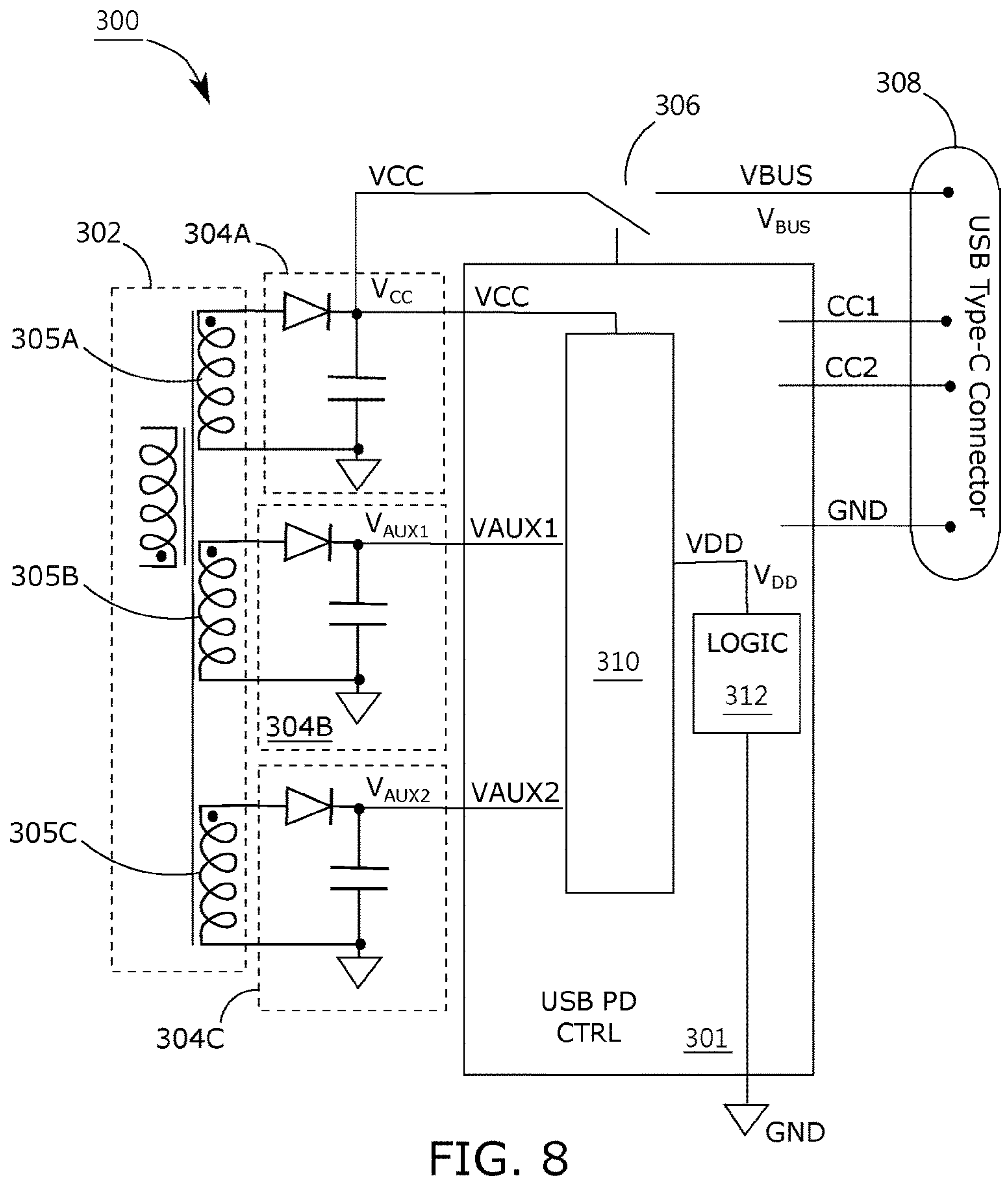
FIG. 8 illustrates a power supply system according to an embodiment of the invention.

FIG. 8 illustrates power supply system 300 according to an embodiment of the invention, which can provide output power source $V_{CC}$ compliant with PD version 3.1, capable of maintaining the voltage of output power source $V_{CC}$ at a maximum of 48V and a minimum of 5V. The similar or the same features between power supply system 300 in FIG. 8 and power supply system 200 in FIG. 2 can be understood from the previous descriptions and might not be repeated here.

In FIG. 8, power supply system 300 includes rectifier filters 304A, 304B and 304C, providing output power source $V_{CC}$, auxiliary power source $V_{AUX1}$, and auxiliary power source $V_{AUX2}$, respectively. $N_{305A}$, number of turns of windings 305A, is the largest; $N_{305B}$, number of turns of windings 305B, is the second largest; and $N_{305C}$, number of turns of windings 305C, is the smallest. $N_{305A}$:$N_{305B}$:$N_{305C}$=3:2:1, for example.

USB PD controller 301 includes power management module 310, which selects one of output power source $V_{CC}$, auxiliary power source $V_{AUX1}$ and auxiliary power source $V_{AUX2}$ as an input power source to build up operation power source $V_{DD}$, which powers logic circuit 312.

Figure 9:
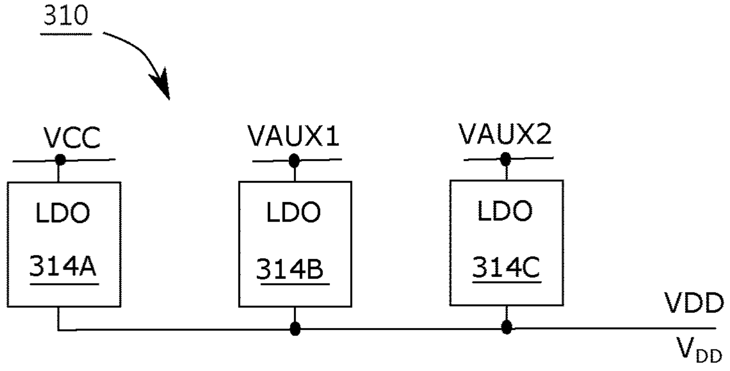
FIG. 9 demonstrates an example of the power management module in FIG. 8.

FIG. 9 demonstrates power management module 310 according to an embodiment of the invention. The similar or identical parts between power management module 310 and power management module 210C can be understood in view of the previous teaching and might not be redundantly detailed. Power management module 310 includes linear dropouts 314A, 314B and 314C, using output power source $V_{CC}$, auxiliary power source $V_{AUX1}$, and auxiliary power source $V_{AUX2}$, respectively, to generate operation power source $V_{DD}$. For example, linear dropouts 314A, 314B and 314C are configured to regulate operation power source $V_{DD}$ at 4.7V, 4.85V and 5V, respectively, and logic circuit 312 could operate normally if operation power source $V_{DD}$ has a voltage between 4.7V and 5V.

Power management module 310 automatically selects one of output power source $V_{CC}$, auxiliary power source $V_{AUX1}$, and auxiliary power source $V_{AUX2}$ as the input power source for generating operation power source $V_{DD}$, in response to the voltage of operation power source $V_{DD}$. If operation power source $V_{DD}$ is at 5V stably, linear dropouts 314A and 314B are turned OFF, and operation power source $V_{DD}$ is supplied power from auxiliary power source $V_{AUX2}$ by linear dropout 314C to regulate at 5V. In case that operation power source $V_{DD}$ is at 4.85V stably, it implies that linear dropout 314A is OFF, and that auxiliary power source $V_{AUX2}$ is too low to support operation power source $V_{DD}$ up to 5V, so linear dropout 314B takes over using auxiliary power source $V_{AUX1}$ to regulate operation power source $V_{DD}$ at 4.85V. When operation power source $V_{DD}$ is at 4.7V stably, it implies that both auxiliary power sources $V_{AUX1}$ and $V_{AUX2}$ are too low to support operation power source $V_{DD}$ at 4.85V, so linear dropout 314A draws current from output power source $V_{CC}$ to power operation power source $V_{DD}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply system comprising:

a first rectifier filter, connected to a first winding for providing an output power source;

a second rectifier filter, connected to an auxiliary winding for providing an auxiliary power source, wherein the first winding and the auxiliary winding are inductively coupled with each other, and the first winding has a first number of turns larger than auxiliary winding does; and a power management module for selecting one of the output power source and the auxiliary power source to be an input power source in response to one of the output power source and an operation power source, wherein the power management module uses the input power source to generate and regulate the operation power source.

2. The power supply system of claim 1, wherein the power management module comprises:

a detector for comparing the output power source and a predetermined voltage;

a linear dropout for generating and regulating the operation power source; and a selection switch connected between the output power source and the linear dropout;

and when the output power source exceeds the predetermined voltage the detector turns OFF the selection switch to reject the output power source being selected as the input power source.

3. The power supply system of claim 2, wherein the power management module comprises:

a diode connected between the linear dropout and the auxiliary power source;

and when the selection switch is OFF the auxiliary power source acts as the input power source to supply power through the diode to the linear dropout.

4. The power supply system of claim 1, wherein the power management module comprises:

a first linear dropout for drawing power from the output power source to generate and regulate the operation power source at a first predetermined voltage; and a second linear dropout for drawing power from the auxiliary power source to generate and regulate the operation power source at a second predetermined voltage higher than the first predetermined voltage.

5. The power supply system of claim 4, wherein the first and second linear dropouts comprise first and second operational amplifiers respectively, the power management module comprises three resistors connected in series between the operation power source and a ground line, and the three resistors provide two joints respectively connected to the first and second operational amplifiers.

6. A method for generating an operation power source, comprising:

providing a first winding and an auxiliary winding inductively coupled to each other, wherein the first winding has a first number of turns larger than the auxiliary winding does; and rectifying a first current from the first winding to generate an output power source;

rectifying an auxiliary current from the auxiliary winding to generate an auxiliary power source;

selecting one of the output power source and the auxiliary power source to be an input power source in response to one of the operation power source and the output power source; and supplying power from the input power source to generate and regulate the operation power source on a power line.

7. The method of claim 6, comprising:

comparing the output power source with a predetermined voltage;

selecting the output power source to be the input power source when the output power source is less than the predetermined voltage; and selecting the auxiliary power source to be the input power source when the output power source exceeds the predetermined voltage.

8. The method of claim 7, comprising:

comparing the output power source with the predetermined voltage to control a selection switch connected between the output power source and a linear dropout; and turning OFF the selection switch when the output power source exceeds the predetermined voltage; and providing a diode connected between the auxiliary power source and the linear dropout.

9. The method of claim 6, comprising, regulating the operation power source at a first predetermined voltage using the output power source; and regulating the operation power source at a second predetermined voltage using the auxiliary power source;

wherein the second predetermined voltage is higher than the first predetermined voltage.

10. A power supply system for generating an operation power source, comprising:

a first rectifier filter, connected to a first winding for providing an output power source;

a second rectifier filter, connected to an auxiliary winding for providing an auxiliary power source, wherein the first winding and the auxiliary winding are inductively coupled with each other, and the first winding has a first number of turns larger than auxiliary winding does; and a power management module comprising:

a first linear dropout connected between the output power source and the auxiliary power source for regulating the auxiliary power source at a first predetermined voltage; and a second linear dropout connected between the auxiliary power source and the operation power source for regulating the operation power source at a second predetermined voltage less than the first predetermined voltage.

11. The power supply system of claim 10, wherein the first linear dropout comprises a first operational amplifier controlling a first power switch connected between the output power source and the auxiliary power source, and the second linear dropout comprises a second operational amplifier controlling a second power switch connected between the auxiliary power source and the operation power source.

* * * * *